(12) United States Patent
Melmoth et al.

(10) Patent No.: US 10,417,360 B2
(45) Date of Patent: Sep. 17, 2019

(54) TRUE HARDWARE IN THE LOOP SPI EMULATION

(71) Applicant: MicroPilot Inc., Stony Mountain (CA)

(72) Inventors: Tyler Desmond Melmoth, Winnipeg (CA); Adam Jacob Toews, Winnipeg (CA); Daniel Serge Brouillette, Winnipeg (CA); Nicholas Andrew Playle, Winnipeg (CA)

(73) Assignee: MicroPilot Inc., Stony Mountain (CA)

( * ) Notice: Subject to any disclaimer, the term of this patent is extended or adjusted under 35 U.S.C. 154(b) by 411 days.

(21) Appl. No.: 14/953,140

(22) Filed: Nov. 27, 2015

(65) Prior Publication Data
US 2016/0154917 A1   Jun. 2, 2016

Related U.S. Application Data

(60) Provisional application No. 62/085,281, filed on Nov. 27, 2014.

(51) Int. Cl.
*G06F 17/50* (2006.01)
(52) U.S. Cl.
CPC ...... *G06F 17/5027* (2013.01); *G06F 2217/86* (2013.01)
(58) Field of Classification Search
None
See application file for complete search history.

(56) References Cited

U.S. PATENT DOCUMENTS

| | | | |
|---|---|---|---|
| 5,808,921 A | * | 9/1998 | Gold ............... G06F 9/455 702/108 |
| 6,234,799 B1 | | 5/2001 | Lin |
| 8,555,243 B2 | | 10/2013 | Correll |
| 2007/0260436 A1 | | 11/2007 | Couretas et al. |
| 2008/0033604 A1 | | 2/2008 | Margolin |
| 2010/0305857 A1 | | 12/2010 | Byrne et al. |

FOREIGN PATENT DOCUMENTS

| | | |
|---|---|---|
| CN | 102566441 A | 7/2012 |
| CN | 102789171 A | 11/2012 |
| CN | 102147987 B | 1/2013 |

(Continued)

OTHER PUBLICATIONS

Kis, Laszlo, Gergely Regula, and Bela Lantos. "Design and hardware-in-the-loop test of the embedded control system of an indoor quadrotor helicopter." Intelligent Solutions in Embedded Systems, 2008 International Workshop on. IEEE, 2008. (Year: 2008).*

(Continued)

*Primary Examiner* — Bijan Mapar
(74) *Attorney, Agent, or Firm* — Miltons IP/p.i.

(57) ABSTRACT

An emulator for emulating at least one digital device communicating over a clocked serial bus, the emulator is provided. The emulator comprises a programmable logic device holding device configuration information and data for the at least one emulated digital device; a communication mechanism for exchanging data between the at least one emulated digital device and a host device; and a decode mechanism that selects response data from the one or more registers.

15 Claims, 9 Drawing Sheets

(56) References Cited

FOREIGN PATENT DOCUMENTS

CN     103034229 A    4/2013
CN     103279126 A    9/2013

OTHER PUBLICATIONS

Xilinx, CPLD, Jul. 6, 2013, retrieved from https://www.xilinx.com/cpld/ via the Internet Archive (https://archive.org/) (Year: 2013).*
Sineglazov, V. M., and S. O. Dolgorukov. "HardWare-In-The-Loop simulation table for UAV navigation complexes testing." Actual Problems of Unmanned Air Vehicles Developments Proceedings (APUAVD), 2013 IEEE 2nd International Conference. IEEE, 2013. (Year: 2013).*
Maxim, Serial-Control Multiplexer Expands SPI Chip Selects, Jul. 1, 2001, retrieved from http://www.farnell.com/datasheets/312519.pdf (Year: 2001).*
Chen, C. A., Chen, S. L., Huang, H. Y., & Luo, C. H. (2012). An efficient micro control unit with a reconfigurable filter design for wireless body sensor networks (WBSNs). sensors, 12(12), 16211-16227. (Year: 2012).*
Adsul, Rahul et al.; "Performance Modeling of Automotive Sensors and Sensor Interface Systems using Simulink"; International Journal of Science and Research (IJSR), India Online ISSN: 2319-70; vol. 2 (2); Feb. 2013; pp. 233-243.
Saggiani, G.M. et al.; "Developing a Hardware-in-the-Loop Simulator for a Rotary Wing Unmanned Aerial Vehicle"; National Instruments; Online: http://sine.ni.com/cs/app/doc/p/id/cs-12188; Sep. 24, 2014, pp. 1-3.
"Serial Peripheral Interface"; Atmel SPI; pp. 1-29.

* cited by examiner

| GPIO1 | GPIO2 | GPIO3 | GPIO4 | ACCEL1 | ACCEL2 | ACCEL1_TEMP | ACCEL2_TEMP | ST1 | ST2 | HEX WORD IN | OUT-PUT WORD | STATE |
|---|---|---|---|---|---|---|---|---|---|---|---|---|
| 0 | 0 | 0 | 0 | 1 | 1 | 1 | 1 | X | X | X3FF | 0F | IDLE |
| 0 | 0 | 0 | 0 | 0 | 1 | 1 | 1 | X | X | X3DF | 0E | ACC1 |
| 0 | 0 | 0 | 0 | 1 | 1 | 0 | 1 | X | X | X3F7 | 0D | ACC1_TEMP |
| 0 | 0 | 0 | 0 | 1 | 0 | 1 | 1 | X | X | X3EF | 0C | ACC2 |
| 0 | 0 | 0 | 0 | 1 | 1 | 1 | 0 | X | X | X3FB | 0B | ACC2_TEMP |
| 0 | 0 | 0 | 1 | 1 | 1 | 1 | 1 | X | X | X07F | 0A | COMPASS |
| ANYTHING ELSE | | | | | | | | | | | 1F | FAILURE |

FIG. 3

TRUE HARDWARE IN THE LOOP SPI EMULATION

TECHNICAL FIELD

The present application relates to emulating communications with sensors over an SPI (Serial Peripheral Interface) for true hardware in the loop applications.

BACKGROUND

Technology companies are developing more complex products than ever before. Fortunately for technology businesses today, newly emerging product development tools allow organizations to bring their complex products to market faster than years prior. Specifically, the aviation and automotive industries rely on advanced simulation to rollout quality products in less time.

Software-in-the-loop (SWIL) and hardware-in-the-loop (HWIL) processes are two popular simulation solutions used by unmanned aerial vehicle (UAV) manufactures.

Software-in-the-loop

SWIL is a type of software testing that detects bugs or regressions in systems. When testing autopilots using SWIL simulation, the autopilot software is recompiled to run on a typical desktop computer and then linked to a six-degrees-of-freedom simulator (6-DOF). This simulator sends and receives data to the vehicle being tested. Specifically, the software converts servo outputs into control inputs to the 6-DOF. Likewise, the software also converts 6-DOF outputs into simulated autopilot sensors inputs (e.g. GPS, pressure altitude, pressure airspeed, acceleration, and gyro rates).

Advantages of SWIL

SWIL simulators are easy to develop. The programming required to convert servo outputs from the autopilot software into inputs to the 6-DOF is simple to generate. Additionally, converting state output of the simulation (e.g. position, altitude, acceleration and angular rates) into appropriately formatted sensor information (e.g. pressure altitude, pressure airspeed, and GPS position) is not complex.

Furthermore, SWIL systems do not require specialized hardware to test the majority of a project's code base, making them simpler and less expensive than other alternatives. With minimal components needed and low costs, SWIL is a popular training aid and testing alternative for several autopilot configurations.

In addition to benefits, such as simple programming and minimal spending, manufacturers in the UAV, aerospace and automotive industries also overcome the obstacle of time with SWIL. For example, design teams reduce some types of testing from months to hours, since an hour flight can be simulated within a few seconds. Faster-than-real-time testing is extremely useful when testing software against a large number of possible inputs, as well as when running optimizations on software. For example, regression tests can be run nightly to test its autopilot software. These tests would take months in real time to simulate, as opposed to hours with a SWIL simulator.

Disadvantages of SWIL

Although a SWIL can test significant portions of an autopilot's software, this type of simulation does not complete a UAV engineer's toolbox. First, most SWILs run off of a PC-based workstation, while the real autopilot runs off of an embedded processor. The discrepancies between these two types of processors provide a testing environment that does not adequately mimic real flight.

For example, autopilot software is typically compiled with a different tool chain than what the SWIL relies on. Therefore, errors introduced by the autopilot's tool chain will not become evident. Moreover, design teams cannot test inputs and outputs (I/O) or software specific to target processors. Nor can they control real hardware, such as servos, camera systems, speed controllers and radio modems.

Furthermore, SWIL's timing differs from the real autopilot's timing. Typically, SWILs run at least ten times faster than real autopilots. This is because SWILs run on computers relying on clock speeds of several gigahertzes, while autopilots depend on microprocessors running at a few hundred megahertz. Another issue to consider is code that interacts with I/O devices (e.g. analog to digital converters, serial channels, and servo output channels) does not carry over to a SWIL arrangement. These disparities fail to simulate close to all possible errors. Therefore, systems that rely on SWIL alone cannot be used to construct an iron bird (as discussed later).

Hardware-in-the-Loop (HWIL)

Both HWIL and SWIL simulation rely on a 6DOF simulator to simulate the UAV in flight; however, the arrangement varies slightly. SWILs run both the autopilot software and the 6DOF on one computer. Conversely, HWIL's run the 6DOF on a typical desktop computer, while the autopilot software runs on real autopilot hardware. Then, the autopilot's outputs (servo signals and other control signals) are sent to the 6DOF and the simulator output is returned to the autopilot.

The aviation industry has been employing HWIL simulation for over twenty years to test aircraft software before they leave the ground. HWIL simulation allows UAV manufacturers to run systems on the actual hardware and processors that the UAV is deployed on during real flight. Equally essential, the system uses the true compiled code that the UAV relies on during real flight. This true-to-life simulation allows design teams to test systems with outputs that depend on present and past inputs, as well as systems with multiple outputs functioning on several inputs.

UAV autopilot manufacturers use HWIL simulators to ensure that autopilot software works correctly. UAV manufacturers incorporate HWIL to assist them in validating that their entire system works correctly.

Building Iron Birds with HWIL

Competent UAV manufacturers employ HWILs to build iron birds, a complete set of aircraft hardware. Iron birds include installed actuators, motors, cameras, and communication equipment. In ideal circumstances, the iron bird's component wiring is identical to the wiring of the real system. Although an iron bird is arranged on a table instead of installed within a vehicle, all flight components are included.

UAV manufacturers rely on iron birds to:
a) Ensure all systems and subsystems work together prior to first flight.
b) Access instrument systems and subsystems. Since systems remain on the ground, engineers maintain better access to systems and subsystems.
c) Facilitate tests that are either impractical or too dangerous to perform during flight, such as stressing systems beyond design limits and checking thermal performance.
d) Implement accelerated life testing, servo movement, and current consumption, prior to first flight.
e) Validate extended flights. HWIL can test flights that last months. (True HWIL, as will be discussed later, is necessary for this test.)

A HWIL simulator is not mandatory when building an iron bird; however, UAV design teams greatly increase the range of tests they can perform with the addition of a HWIL autopilot simulator. Without employing a HWIL simulator, design teams can perform useful tests, such as overall current consumption, actuators at or beyond their rated load, component vibration toleration, and component under elevated temperatures. Without a HWIL incorporated into the iron bird, all tests that require simulated UAV flight are beyond reach. The design team cannot validate the entire UAV under typical flight conditions unless a HWIL is used in the iron bird. Since a key component of any unmanned system is the autopilot, it is important to incorporate the autopilot into the simulation before actual flight. The preferred method is to employ a hardware-in-the-loop simulator along with the autopilot.

QuasiHWIL Versus THWIL

HWIL simulation can be broken down into two types: quasi-hardware-in-the-loop and true-hardware-in-the-loop. In both types, autopilot software runs on the actual autopilot, however, the two simulators differ, as will be explained and as shown in FIG. 1.

Quasi-Hardware-in-the-Loop (qHWIL): In a qHWIL system, autopilot software runs on the actual autopilot, which provides more comprehensive and more realistic testing than SWIL simulators. In a qHWIL arrangement, the autopilot and simulator communicate either via a serial port, CAN bus, Ethernet, or other communication mechanism. However, when servo signals and sensor data are exchanged in this way, code executed by the autopilot is not identical to what the autopilot executes in flight. Before the servo values are output to the communication mechanism 106, control loops or PID are calculated 102 and servo mixing is performed 104. The simulator will read the servo values from the communication mechanism 106, then calculate simulated sensor values based on the servo values and a physical model. The simulator will output these sensor values via the serial port or CAN bus. The autopilot will read the sensor values from the communication mechanism 108, then calibrate the sensor values it receives 110 and use the calibrated sensors for the next iteration of the control loops. This is in contrast to a real autopilot where the servo values are output 112 to PWM hardware on a processor and the sensor values are read 114 directly from ADC converters or direct from the sensors.

Also important to note, during qHWIL simulation, the flight must run in real time and include an autopilot. On the up side, design teams can control real hardware with qHWIL and therefore implement a simulated iron bird.

True-Hardware-in-the-Loop (THWIL): As with qHWIL, in THWIL arrangements, autopilot software runs on the actual autopilot and simulators run on PCs. The autopilot and simulator communicate electrically using the same mechanisms that the autopilot uses to communicate with the sensors and servos in real flight. Before the servo values are output to the PWM hardware 112, control loops or PID are calculated 102 and servo mixing is performed 104. Simulators read servo outputs from the autopilot via the PWM hardware and generate correct electrical signals to simulate the autopilot sensors. The autopilot reads the sensor values 114 directly from ADC converters or direct from the sensors. The autopilot will calibrate the sensor values it receives 110 and use the calibrated sensors for the next iteration of the control loops.

Although, qHWIL offers more fidelity than SWIL, qHWIL simulation introduces inaccuracies due to data coming into UAVs through serial ports and CAN buses instead of directly from sensors. THWIL offers the truest-to-life simulation for UAVs available on the market today. The THWIL electrically simulates all analog sensor outputs using analog-to-digital converters, signal conditioning and PWM interface boards. All sensors are removed from the autopilot.

There are no delays introduced by transmitting sensor values, since the simulator generates the actual sensor signals. The THWIL allows for adjusting flight parameters, as well as checking integrity and functioning of on-board equipment and payloads. THWIL allows the replication of UAV flight conditions, which provides design teams with superior on-the-ground validation of autopilot setup and integration.

In the THWIL of Micropilot, trueHWIL™, MathWork's MATLAB is used as a simulation and programming environment. Models built using Simulink and MATLAB are compiled and sent to the xPC Target computer with installed I/O hardware. This acquisition hardware is connected to the autopilot and reads its outputs and stimulates its inputs. Connection can also be made to other UAV hardware components to provide extended functionality of the simulator.

Please note, THWIL simulators require a sensorless autopilot or an autopilot in which the sensors have been disabled so that the pins that the sensors would use can be used for input. In addition, this simulator can control real hardware, and therefore can be used to implement an iron bird. Although iron birds can be based on quasiHWIL, those built using THWIL are more effective.

In THWIL, the sensors (gyros, accelerometers, airspeed pressure sensors, altitude pressure sensors) are stripped off of an autopilot and the sensor inputs to the autopilot are electrically simulated. Using a number of PWM (Pulse Width Modulation) input channels or an analog voltage signal, the simulator reads servo positions from the autopilot. The simulator then simulates the vehicle's reaction to those control inputs and calculates the appropriate sensor outputs and translates them into the appropriate analog voltages (the same voltage the sensor would generate). The autopilot reads these voltages as if they come from a real sensor. The advantage of this type of simulation is the autopilot executes its code as if it flying the drone—it has no idea it is flying a simulator so the code paths the processor would take are the same as without a simulator.

Many autopilot implementations are now switching to digital sensors that communicate with the autopilot over an SPI (Serial Peripheral Interface). The above described simulation of sensors works well with analog sensors but does not work with digital sensors. These digital sensors have analog to digital converters built in and therefore the simulator has no access to the analog signal. Simulating the digital outputs is much more difficult.

Digital sensors communicate with a microcontroller over some form of clocked serial bus—either SPI (Serial Peripheral Interface) or I2C (Inter-integrated Circuit). Typically, these sensors have a number of registers that contain sensor data and status information and have a two word communication process. The first word will be a command from the microcontroller (or master) to the sensor (or slave) and the second word will be data from the sensor to the microcontroller. Typically the microcontroller will start the process using a chip select signal in the case of SPI (in I2C, the address is built into the command so no chip select is necessary) followed by transmitting a command word to the sensor. The command word will be a fixed number of bits. The number of bits in the command word depends upon the sensor. The command word will contain a number of bits that specify which register within the sensor the microcontroller wishes to read. Examples of types that can be included in the command word are read/write and register number. Typically, between two and four bits will be used to select the register and the position of these bits within the command word varies with each sensor. Immediately after receiving the command word, the sensor will respond with the data word. The length of the data word varies with each sensor and the contents depend upon the register address specified in the first word.

These sensors are implemented directly in hardware and have no microcontroller. As such, the response time between receiving the last bit of the command word and outputting the first bit of the data word is very short. Typically, the response time is a single bit time. As clock rates for these devices can go into the hundreds of kilohertz or megahertz it is not possible to emulate one of these sensors using software on a microcontroller. The time is too short for microcontroller clock rates.

SUMMARY

In one aspect, there is provided an emulator for emulating at least one digital device communicating over a clocked serial bus, the emulator comprising: a programmable logic device holding device configuration information and data for the at least one emulated digital device; an input for receiving dynamic data from a simulation model, the dynamic data to be used as values for the digital device to process; a decode mechanism that selects response data from one or more registers on the programmable logic device; and an output for sending the response data to a recipient.

BRIEF DESCRIPTION OF THE DRAWINGS

FIG. 3 is a table showing chip selects on a CPLD (Complex Programmable Logic Device) used in one embodiment of the disclosed emulator;

DETAILED DESCRIPTION

Figure 1:
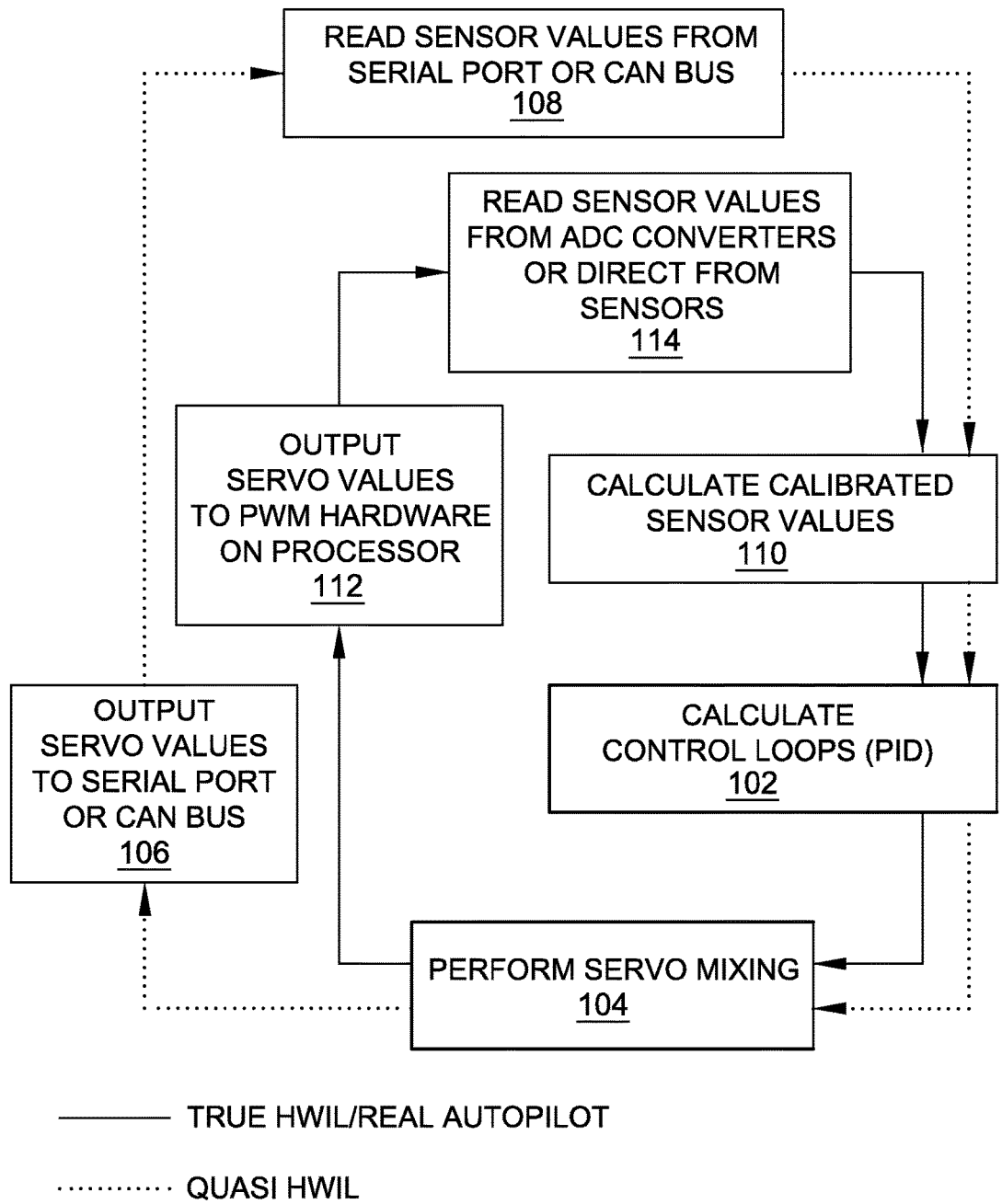
FIG. 1 is line drawing showing the difference between trueHWIL, Real Auotpilot and quasiHWIL.

To the accomplishment of the foregoing and related ends, certain illustrative aspects are described herein in connection with the following description and the annexed drawings. These aspects are indicative of the various ways in which the principles disclosed herein can be practiced. Other advantages and novel features will become apparent from the following detailed description when considered in conjunction with the drawings.

The emulator disclosed herein is applicable to testing any design that uses digital sensors. Some examples might include: Automotive engine management systems, Automotive stability control systems (anti-skid), Cell phones with built in compasses/gyros/accelerometers and UAVs (Unmanned Aerial Vehicles).

To enable the short turnaround time between command and data signals, embodiments of the disclosed emulator for the digital sensors are implemented in some sort of programmable logic, such as but not limited to an FPGA. In addition to the circuitry to emulate an external sensor, the digital sensor emulator has an interface to the logic device that allows it to exchange data with the simulator.

Some components of the I2C/SPI emulator disclosed herein are:

- A communication mechanism so that the emulator can exchange data with a simulator. The communication mechanism must include addressing information so that the emulator can tell into which registers the data should be placed.
- A mechanism to ensure that data is only placed into a register that is not in the process of being read to ensure that half of one sample is not read in conjunction with half of another.
- A bank of registers where the next sensor or sensor status reading resides. Some responses may be hard coded and some responses may simply echo the bits received. There may be other options.
- A decode mechanism that, when a SPI/I2C command arrives, selects the response data from the appropriate register.
- A configuration mechanism where the lengths (in bits) of the configuration and response data can be stored as well as the locations of the select bits in the configuration packet (this can be configurable registers or hard coded).

In an embodiment of the disclosed emulator, a microprocessor is used to implement the communication mechanism with the simulator. As the microprocessor receives information it loads the information into the appropriate register of a FPGA (Field Programmable Gate Array).

By implementing the emulator in hardware (rather than software), the response time required to emulate a digital sensor is achievable. The simulated sensor is able to respond in the same sort of timeframe as the real sensor.

In the description below, a device refers to the register. Each register has its own configuration information. The system emulates SPI communication to sensors by implementing N devices. A device is defined by:

a chip select which activates it
a pattern of bits required on MOSI (Master Out Slave In) to activate the device
a data string sent in response
other options One physical chip may have to be simulated as multiple devices, for example, if multiple data responses are required depending on which command is sent.

Figure 2:
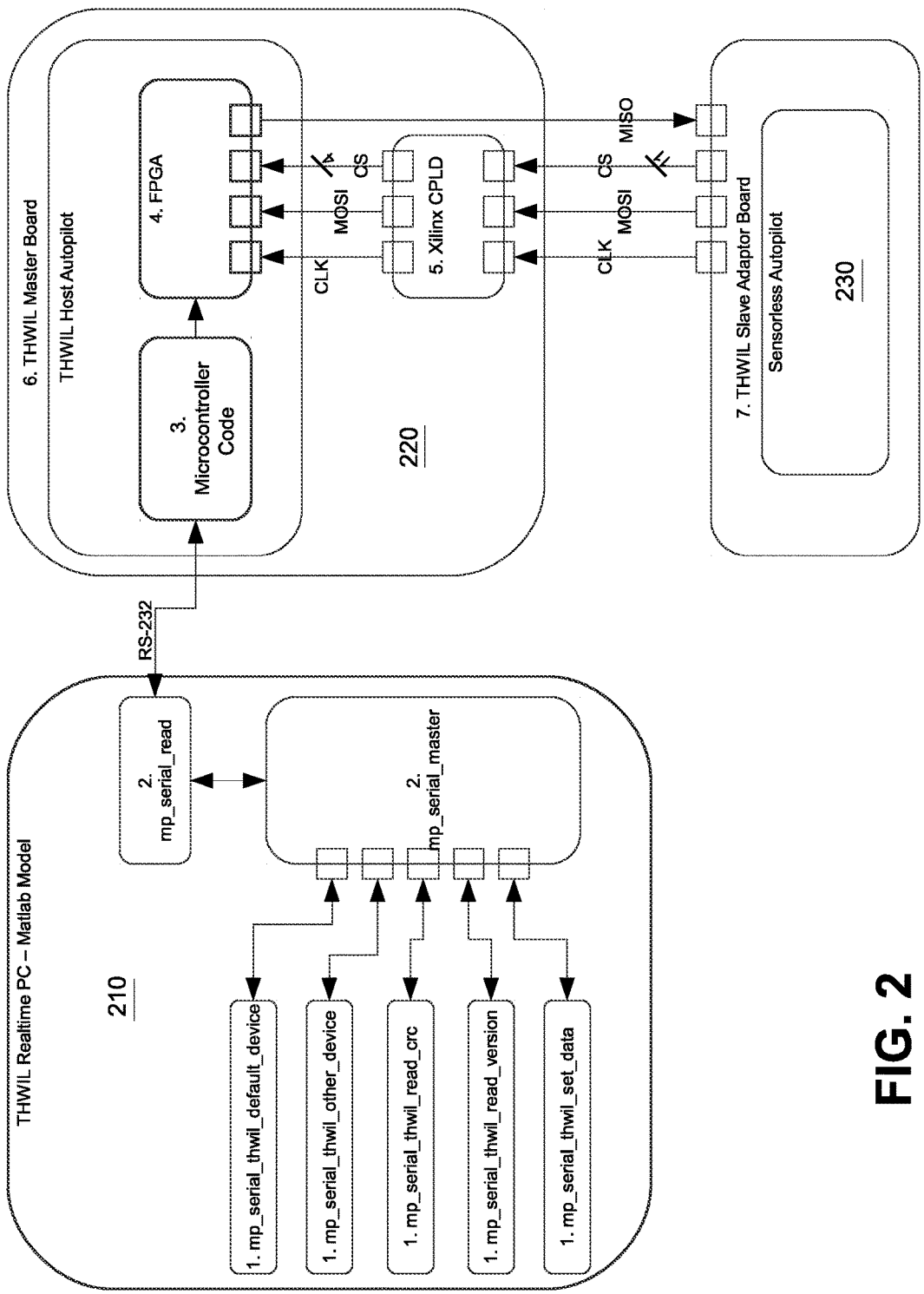
FIG. 2 is a line drawing of an SPI sensor emulator according to an example embodiment.

Referring to FIG. 2, the system has the following components:

a matlab simulink model 210 that will implement blocks that generate packets 1 to be sent to the THWIL host autopilot. These packets 1 will configure the devices that the host is emulating, and the data that those devices provide.

matlab realtime uav communication blocks 2 that will implement the serial port communication to the host autopilot 220.

A microprocessor (in this particular example, a host autopilot) 220 that will receive the serial port commands and send responses. When a device or its data is configured, the autopilot will pass the information using autopilot code 3 to an FPGA 4.

The FPGA 4 that holds device configuration information and data, and will respond when queried by the appropriate chip selects, SPI clock, and MOSI data.

a CPLD 5 that is used to encode 11 individual chip select signals into a 4-bit number based on which of the 11 chip selects is enabled. Note that only one can be enabled at a time otherwise a communication collision will occur on the SPI pins.

a Master PCB 6 that connects DB-9 connectors from the Matlab PC 210 and the digital harness from a sensorless autopilot 230.

a Slave PCB 7 that takes the signal pins from the autopilot board 230 and provides a digital harness to the master PCB 6.

More generally, the block 210 labelled "SWIL Realtime PC—Matlab model" in FIG. 2 is a simulation or simulator. The simulator simulates real world dynamics and provides values for the sensor to sense. The block 7 labelled "THWIL Slave Adapter board" in FIG. 2 could be any system under development which receives sensor data from the emulator. The block 6 labelled "THWIL master board" in FIG. 2, in a more general application, is a sensor emulator. The emulator accepts sensor values from the simulator and provides this data to the system under development in such a manner that the system under development cannot tell that the data is coming from a simulator. The line labelled RS232 in FIG. 2, in more general terms, is a mechanism that can exchange data between the simulation and the sensor emulator. The communication mechanism can be implemented in many different ways. The easiest are serial (RS232, RS 485, Ethernet) but it also could be implemented by a parallel interface. A serial interface was used in the embodiment shown in FIG. 2 because it was readily available. However, if by using a parallel interface the microprocessor in the sensor emulator would not be required, then the emulator could be implemented simply with only a digital logic device.

The TWHIL Realtime PC 210 shown in FIG. 2 is not part the sensor emulator. It is part of the description of the implementation in which the emulator is used. The TWHIL Realtime PC 210 covers the Simulink blocks that are involved with communicating simulated sensor data to the sensor simulator. The sensor simulator does not necessarily have to be connected to a simulator developed in Simulink.

The sensorless autopilot 230 (part of 7) shown in FIG. 2 is the autopilot that is flying the simulated aircraft. The "slave adaptor board" 7 is a small circuit board to make connecting the autopilot to the sensor simulator less messy.

The Xilinx CPLD 5 is not used in all embodiments. It could be part of the FPGA 4. However, in the embodiment shown, there were not enough pins on the FPGA 4.

The embodiment shown uses a "trueHWIL host autopilot" 220 to implement items 3 and 4. This is an autopilot board that has been re-purposed to implement the SPI simulator. It is not used as an autopilot anymore. An autopilot board was used for four reasons: (a) it has an FPGA on it that could be re-purposed; (b) it has a microcontroller on it that could be used to parse the communication packets coming from the simulator; (c) it was a known device with which the inventors were familiar; and (d) they were readily available. Another device that could be used is a custom circuit board with a microcontroller and a CPLD on the board.

In the embodiment shown, the Xilinx CPLD 5 on the THWIL master PCB 6 implements an encoder of the chip select signals as shown in table in FIG. 3.

Communication Protocol Between THWIL Host and Matlab

This section describes the communication protocol between the Matlab THWIL model and the THWIL host autopilot that generates sensor values for the autopilot under test.

General Packet Format

The communication will use the autopilot protocol with the following packet format:

| Byte # | 0 | 1 | 2 | 3 to N−3 | N−2 | N−1 |
|---|---|---|---|---|---|---|
| Contents | 0xff | Seq # | Cmd byte = 't' | Data | chksum | 0xfe |

The response from the THWIL host autopilot to Matlab will be:

| Byte # | 0 | 1 | 2 | 3 to N−3 | N−2 | N−1 |
|---|---|---|---|---|---|---|
| Contents | 0xff | Seq # | MP response code | Data | chksum | 0xfe |

In the embodiment described, all values in the 16 or 32 bit data fields will be little-endian. The data and configuration words will be big-endian.

Request Version String Packet:

This packet will request the version string from the THWIL host code.

| Byte # | Contents |
|---|---|
| 0 | 'v' |

Response:

| Byte # | Contents |
|---|---|
| 0 | MP OK |
| 1 − N−1 | Version string |

Configure Default Device Packet

This packet will tell the THWIL host to configure a default device for which the configuration information is available in code to allow simple configuration of known devices. If a bit is set that device will be configured, and will remain configured until another configuration is loaded for the device. Setting a bit to zero will not remove the configuration for the device. The devices must be configured before any SPI transactions are done because results are undefined if a device is reconfigured while it is being accessed by SPI.

| Byte # | Contents |
|---|---|
| 0 | Reserved |
| 1-3 | ADIS16006 accelerometer: |
| 4 | Bit 0 = configure device 0 as xy accelerometer x axis for chip select 1 xy |
| | Bit 1 = configure device 1 as accelerometer y axis for chip select 1 xy |
| | Bit 2 = configure device 2 as accelerometer temperature for chip select 2 z |

| Byte # | Contents |
|---|---|
| | Bit 3 = configure device 3 as accelerometer y axis for chip select 3 z |
| | Bit 4 = configure device 4 as accelerometer temperature for chip select 4 |
| | Bit 5 = configure device 5 as compass adc data word and 6 as compass adc read config string |
| | Bit 6 and 7 = reserved |

Response:

| Byte # | Contents |
|---|---|
| 0 | Response code - MP_OK or an error code |

Configure Arbitrary Device Packet

This packet will tell the THWIL host to configure a device for which a default configuration is not available to allow new devices to be configured without having to change THWIL host code. The devices must be configured before any SPI transactions are done because results are undefined if a device is reconfigured while it is being accessed by SPI.

| Byte # | Contents |
|---|---|
| 0 | 'D' |
| 1 | Device # to configure |
| 2-19 | Configuration string for device. See Configuration Bits section. |

Response:

| Byte # | Contents |
|---|---|
| 0 | Response code - MP_OK or an error code |

Set Device Data Packet

This packet will tell the THWIL host what data to provide when a specified device is queried.

| Byte # | Contents |
|---|---|
| 0 | 'S' |
| 1 | Device # to set data for |
| 2 – N-1 | Data string for the device. The number of data bytes must be an even number. |

Response:

| Byte # | Contents |
|---|---|
| 0 | Response code - MP_OK or an error code |

Bandwidth Analysis

During operation of the embodiment described above, the only packets required are to set the device data. To set N bytes of data for one device, the maximum bytes required is 8+2*N (assuming all bytes are stuffed).

For all of the accelerometers and accelerometer temperatures updating at F hz, we get a total of (8+(2*2)) bytes*5 devices*F hz=60*F hz. At a frequency of 100 hz which is the realtime sim update rate, this gives 6000 bytes/second which is slightly above 57600 baud. The compass will require an extra (8+(2*6)) bytes*30 hz=1680 bytes/sec. The total rate is 7680 bytes/second therefore the baud rate should be set to 115200 or higher.

SPI Device Configuration

Configuration Bits

This describes the meaning of the bits when setting a configuration word in one embodiment of the disclosed emulator.

| Bits | Description |
|---|---|
| 143-136 | The SPI input size, currently unused. |
| 128-135 | The SPI transaction size, SPI_out_size. The data register will be sent starting at bit SPI out size-1 |
| 120-127 | Command start bit, currently unused. |
| 119-112 | Command end bit, the number of bits of the SPI input to compare to the configuration string before deciding if it is a match. |
| 111-40 | Unused |
| 39-16 | Configuration string that must be matched to the SPI input to activate the device. |
| 15-12 | Chip select used - which combination of chip select signals will activate the device. Bit 0 = TPU 12 Bit 1 = TPU 0 Bit 2 = TPU 14 Bit 3 = TPU 9 |
| 11-10 | Unused |
| 9 | Check every byte received to see if it matches the configuration string, even if it is not the first byte after CS is asserted. Can be used to respond to a command if multiple commands are sent in a row without de-asserting CS. It is used to emulate the CS5524 ADCs for the compass. |
| 8 | Pull SDO low when chip select is asserted for this device if there has been new data latched since last time the device was valid. This is to implement the behaviour of CS5524 ADCs for the compass. |
| 7-0 | Data hold time, unused |

List of Available Device #s

This contains the list of which device #s are available on the FPGA in one embodiment. The default devices can only have their chip selects set. If the chip select is set to zero the device is disabled.

| Device # | Device Name |
|---|---|
| 0 | ADIS 16006 XY accelerometer X axis |
| 1 | ADIS 16006 XY accelerometer Y axis |
| 2 | ADIS 16006 XY accelerometer temperature |
| 3 | ADIS 16006 Z accelerometer Y axis |
| 4 | ADIS 16006 Z accelerometer temperature |
| 5 | Micropilot Compass ADC CS5524 data word |
| 6 | Micropilot Compass ADC CS5524 config word |
| 7-11 | User configurable devices |

Simulating Compass ADC

In the embodiment shown, during initialization the configuration of the ADC (analog to digital converter) of the compass will be queried by the sensorless autopilot. The ADC must reply with the expected configuration. This is addressed by configuring a default device with a fixed data string since the expected configuration has a fixed value. In other embodiments, a compass is queried during initialization with a command to read a configuration data string. The compass will reply with contents of the configuration string and an indication that the reset is valid.

During operation the compass must respond to a chip select with no clock by bringing SDO (Serial Data Output) to ground if a sample is ready and leaving it high impedance if there is no sample ready. A sample is defined as being ready when a new data write has occurred to the compass data device since the last time that the compass data device was read by asserting the chip select and applying a clock signal.

In the embodiment shown, the compass data must be generated at 30 hz and this generation timing is handled by the Matlab model. The Matlab model will send a new 'set data' packet to the master autopilot at 30 hz, triggering the FPGA to see that new data is available and should be given to the slave autopilot the next time the chip select is asserted. Tests showed that when a baud rate of 57600 was used with all devices transmitting data, the slave autopilot had data jumps because some samples were missed and the set/reset signal was not decoded properly. A baud rate of 460800 was found to generate data cleanly.

In the embodiment shown, the matlab model has a block which takes autopilot orientation data and calibration constants in, and outputs the ADC data bytes required for the set/reset signal and raw signals.

Figure 4:
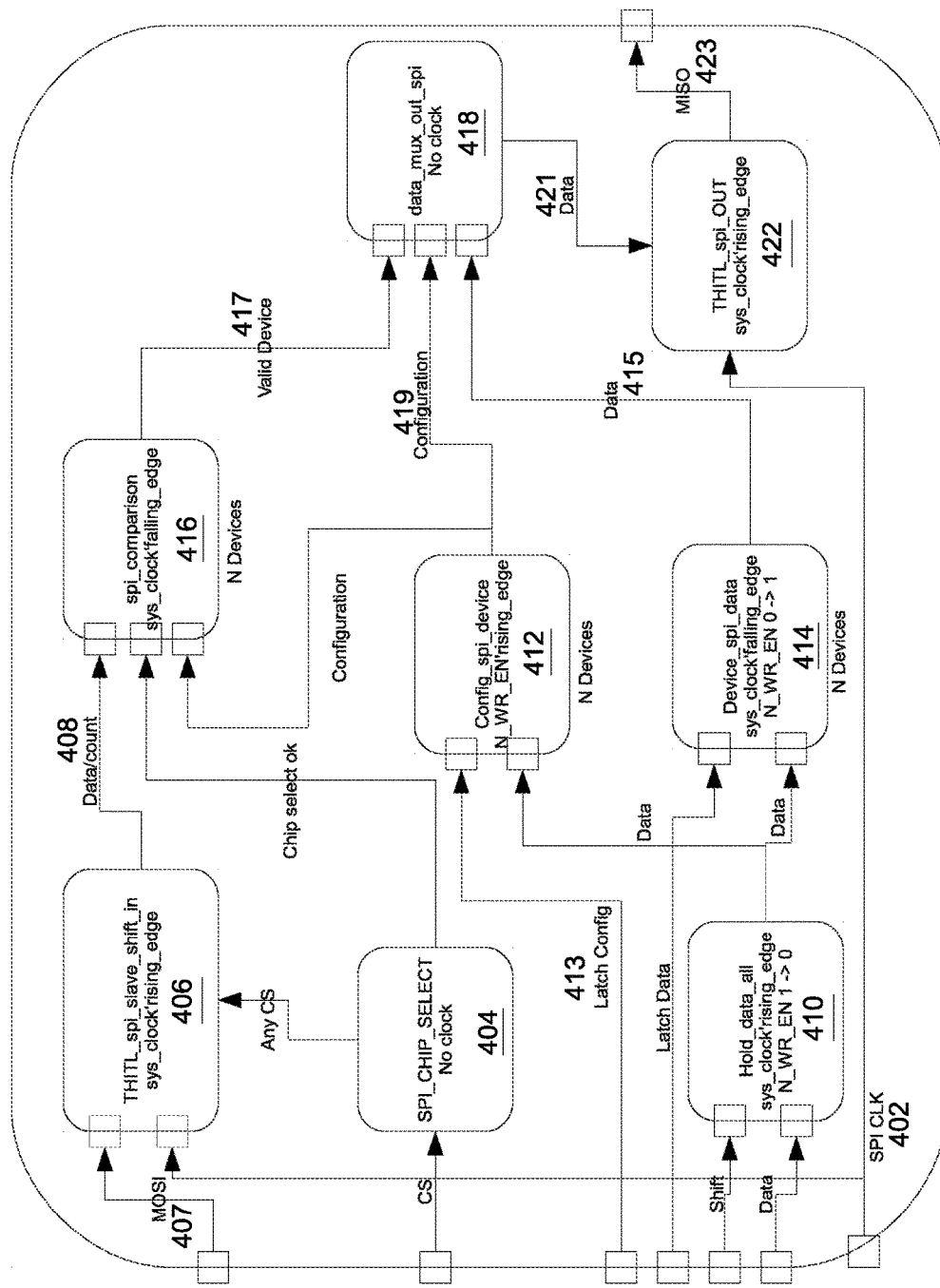
FIG. 4 is a VHDL component overview block diagram of an emulator according to one example embodiment.
Figure 5A:
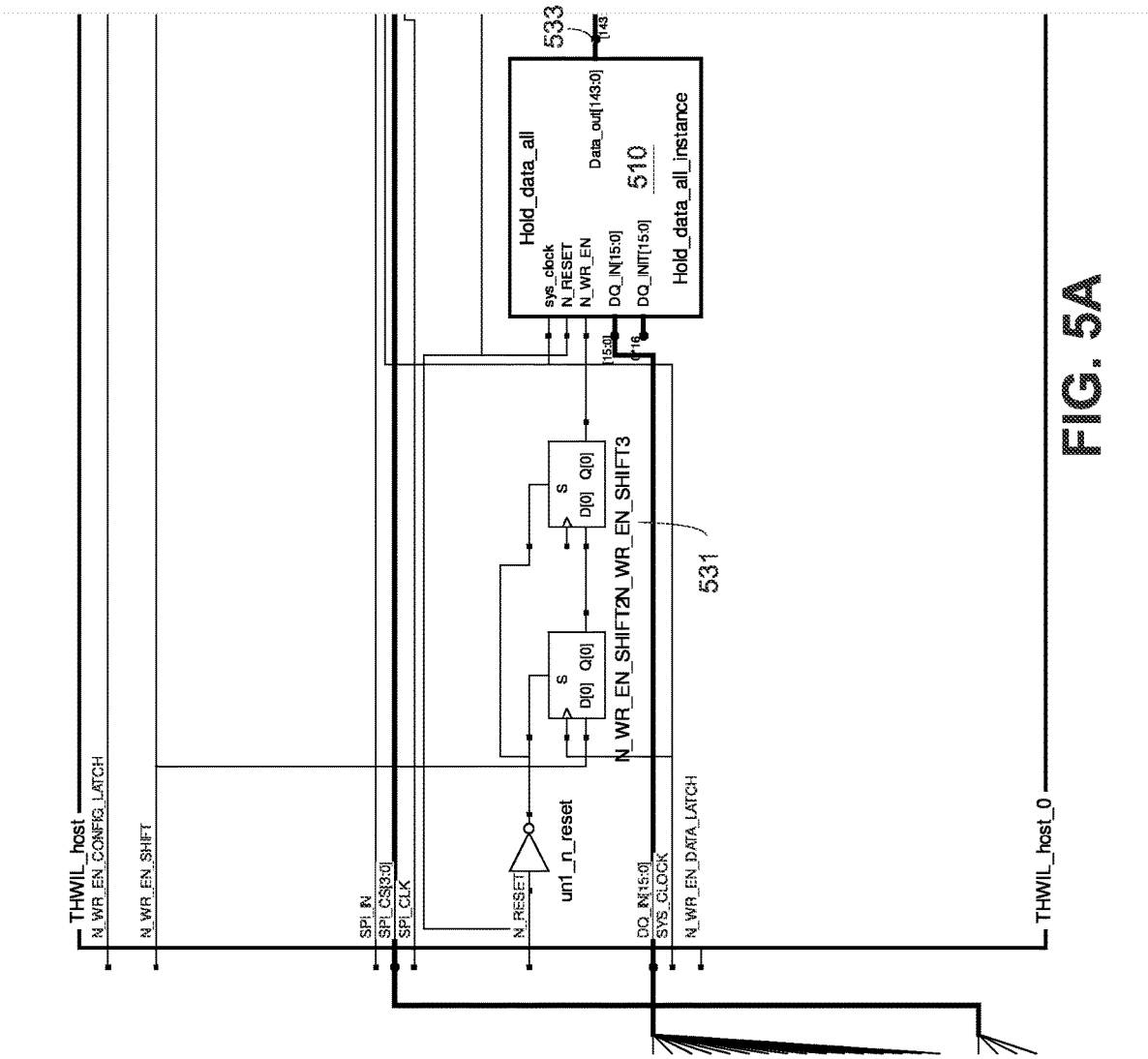
FIG. 5A to 5D show a VHDL detailed component block diagram of an emulator according to one example embodiment.
Figure 5B:
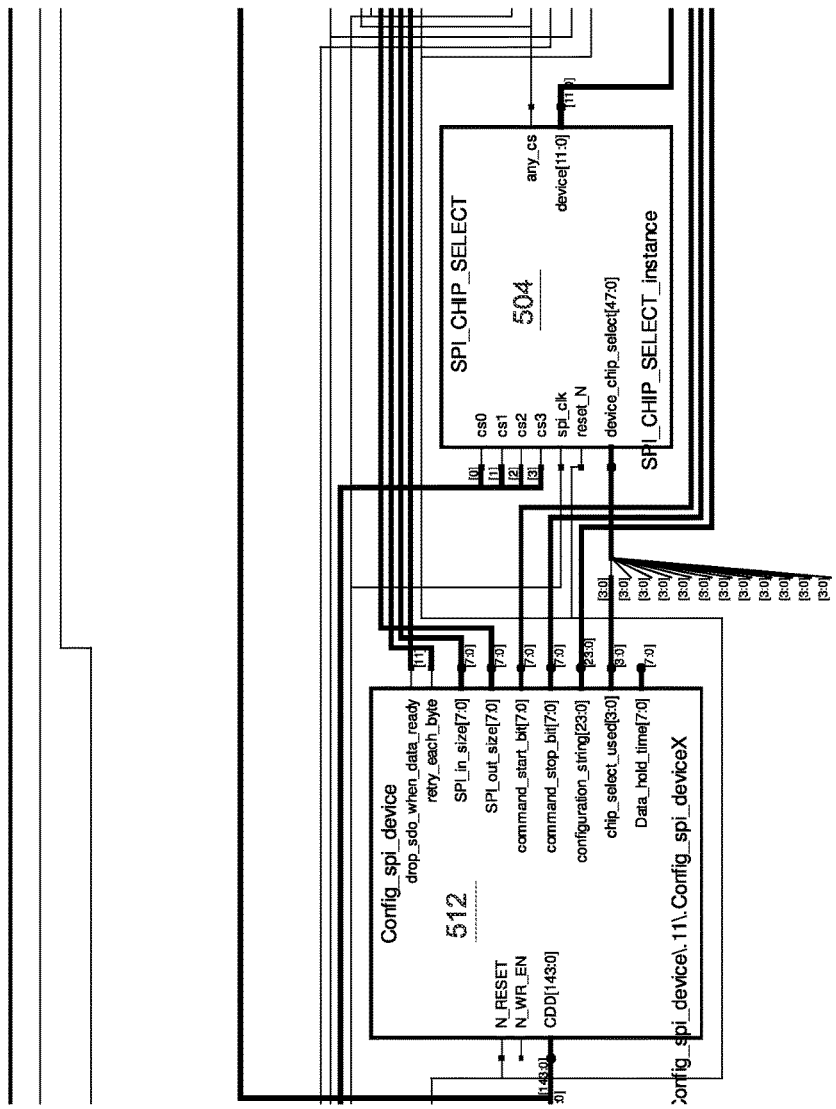
Figure 5C:
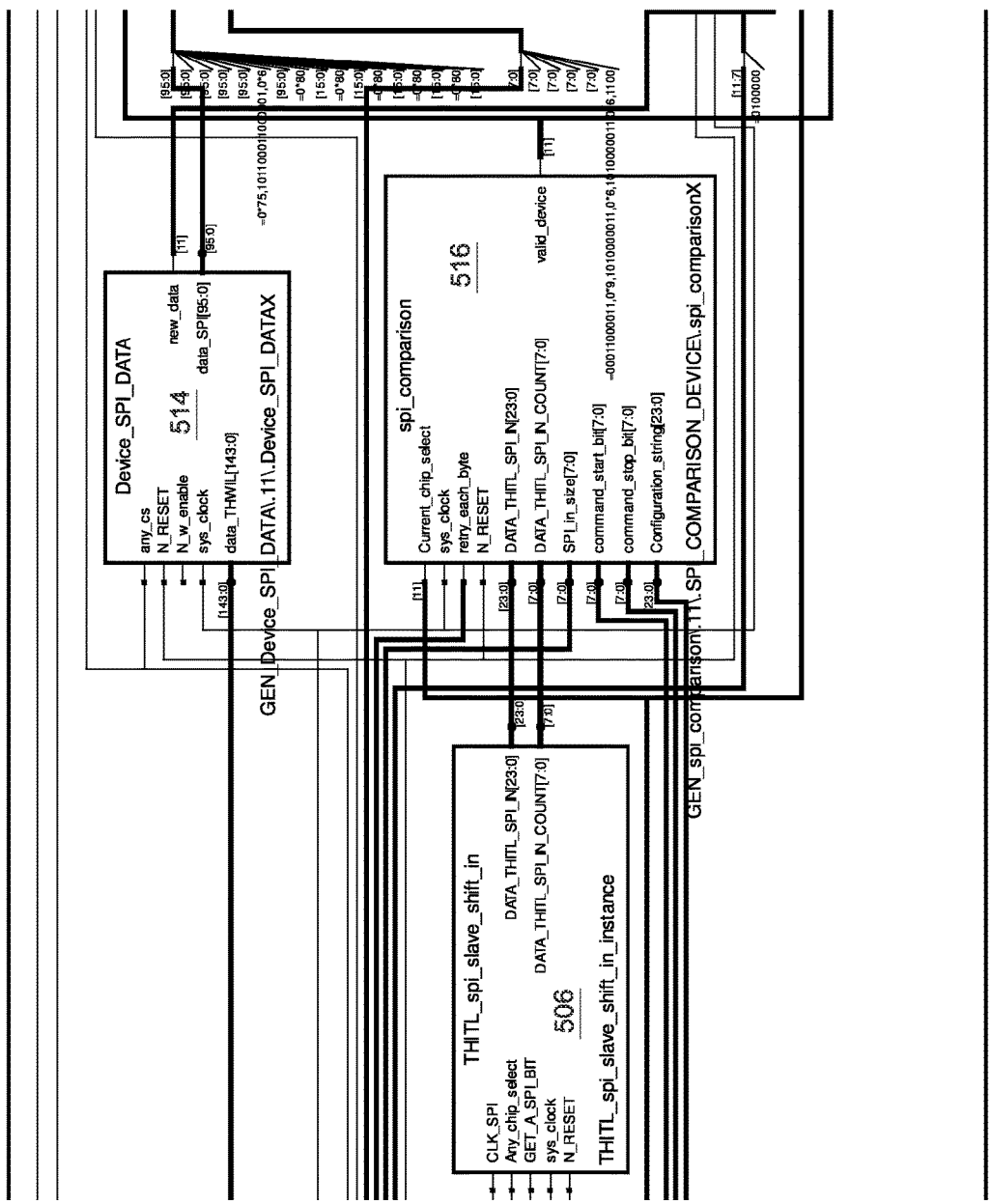
Figure 5D:
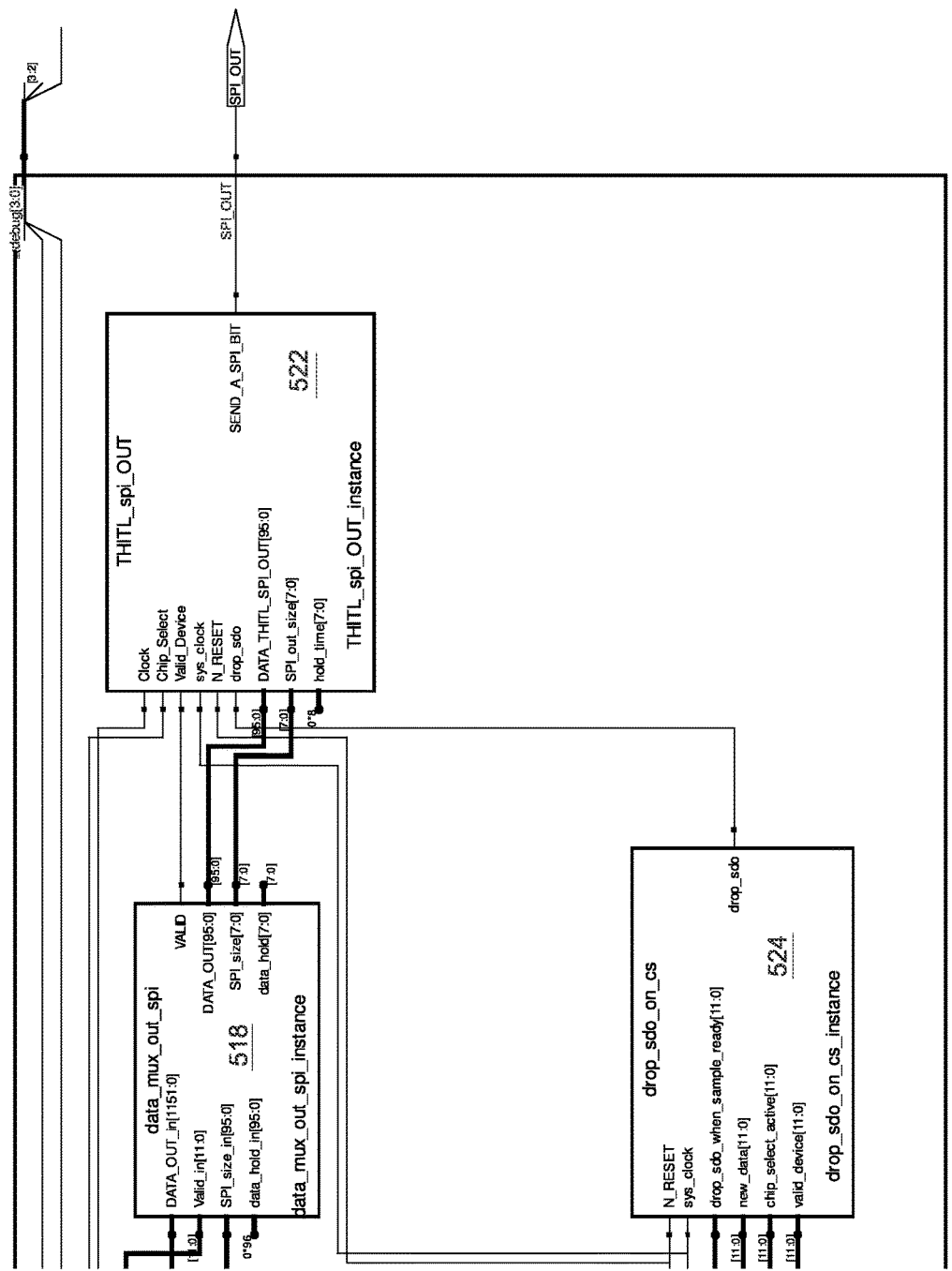
Figure 6:
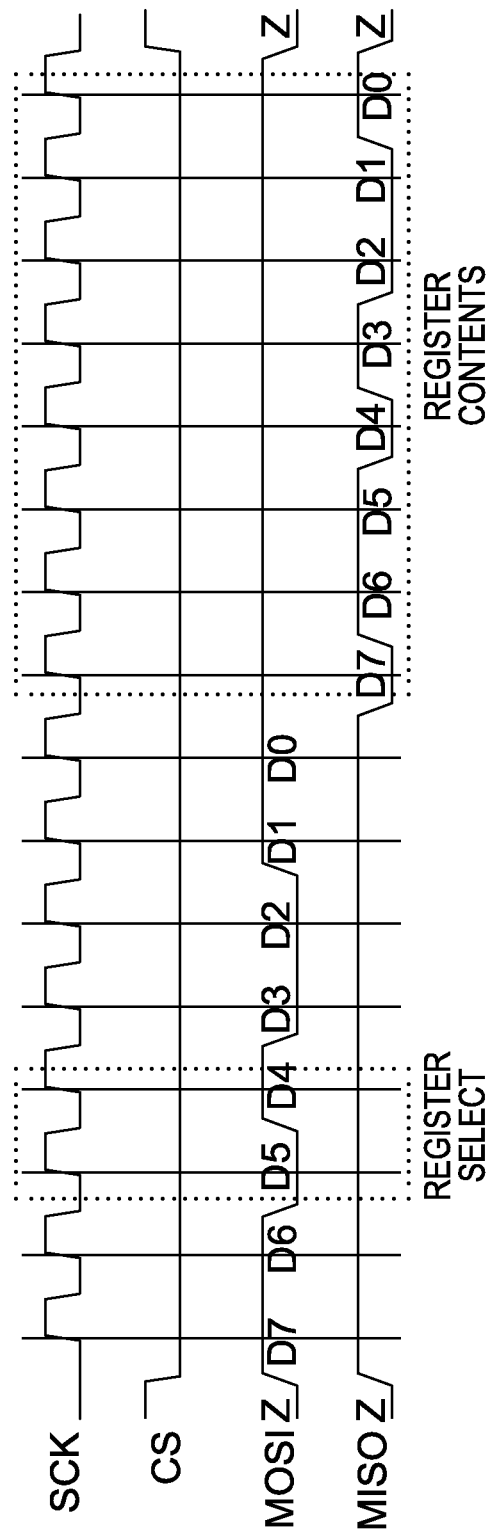
FIG. 6 is a timing diagram for an emulator according to one example embodiment.

Referring now to FIG. 4, VHDL components to implement an emulator according to one embodiment of the present disclosure will be described. The system is run by a 32 Mhz clock ("sys_clock—not shown) and all other signals are sampled on that clock edge. Blocks alternate between rising edge and falling edge so that one block's output occurs on falling edge and the input is used on rising edge. The signals for chip select and SPI clock are debounced outside of the main THWIL block to avoid double clock edges. The SPI_CHIP_SELECT 404 decodes the chip selects from the autopilot under tests and asserts the any_cs signal if any chip select is active, and asserts a signal for any device whose chip select matches the current chip select. The THITL_SPI_slave_shift_in 406 reads bits from the MOSI line 407 upon SPI clock 402 transitions when any_cs is asserted, stores the data in a register, and provides the register and data bit count 408 as outputs. The Hold_data_all component 410 takes individual 16-bit writes to the FPGA register by writes to the 'shift register' to set the device configuration and data words, and provides an output of the full 144 bit word. The Config_SPI_device component 412 has one instantiation per device and contains that device's configuration string. When the 'latch config' register 413 is written to by the host autopilot, the data at the output of Hold_data_all 410 will be stored inside the Config_SPI_device component as the configuration string and presented at the output. Device_SPI_data component 414 has one instantiation per device and contains that device's data string. When the 'latch data' register is written to by the host autopilot, the data at the output of Hold_data_all 410 will be stored inside the Device_SPI_data component as the data string and presented at the output. The spi_comparison component 416 has one instantiation per device. When the chip select for the device is active, it compares the data/count output from THITL_SPI_slave_shift_in 406 and the configuration word. If they match, the 'valid device' signal 417 is asserted. The data_mux_out_spi component 418 outputs the data string and number of bits for a device that has found a match for its configuration string 419 and chip select from the spi_comparison component 416. It will take the data strings 415 from each device, and the 'valid device' signal 417, and will output the data string 421 of the first device it finds that has 'valid device' asserted. The THITL_spi_OUT component 422 will take the data 421 provided by data_mux_out_spi 418 and shift it out the MISO line 423 one bit at a time upon SPI clock transitions. FIG. 6 shows a timing diagram for the emulator.

Referring to FIGS. 5A to 5D, the components of an embodiment of the emulator will be explained in more detail.

Emulator Microcontroller Interface to FPGA: For this embodiment, the microcontroller is interfaced to the FPGA by placing the FPGA on the microcontroller's bus as a 16-bit memory mapped device. The microcontroller communicates to the FPGA by issuing writes to registers, as in the following C code example:

fpgaMemoryMap[DATA_REG_ADDRESS]=0x5A5A;
　　//shift first 16 bits into Hold_data_all 510 block.
fpgaMemoryMap[DATA_REG_ADDRESS]=0x8080;
　　//shift next 16 bits into Hold_ data_all block.
fpgaMemoryMap[LATCH_DATA_ADDRESS]=4; //advise device_spi_data[4] block 514 to store the shifted data (0x80805A5A) into the data register for device 4.
fpgaMemoryMap[DATA_REG_ADDRESS]=0x1234;
　　//shift first 16 bits into Hold_data_all block.
fpgaMemoryMap[LATCH_CONFIG_ADDRESS]=5;
　　//advise Config_spi_device[5] block 512 to store the shifted data into the config register for device 5.

FPGA External Interface to SPI Emulator VHDL Block: In this embodiment, the following mapping occurs from the external FPGA signals to the VHDL block diagram for emulating SPI:

N_RESET: External reset signal.
SYS_CLOCK: System clock at 32 mhz.
DQ_IN[15:0]: Data on data bus from microcontroller.
N_WR_EN_SHIFT: Becomes asserted when the microcontroller writes data to the shift register address.
N_WR_EN_DATA_LATCH: Becomes asserted when the microcontroller writes data to the "latch data" register address.
N_WR_EN_CONFIG_LATCH: Becomes asserted when the microcontroller writes data to the "latch config" register address.
SP_IN: MOSI signal from system under development.
SPI_CLK: Clock from system under development.
SPI_CS[3:0]: Chip select from system under development after going through CPLD encoder.
SPI_OUT: MISO signal from FPGA to system under development.

The various components of the VHDL Block Diagram of FIG. 5 will now be described.

The Hold_data_all component 510 shifts in 16 bits of data in from the microcontroller's data bus when the N_WR_EN_ SHIFT signal 531 is asserted, and provides the combined data 533 at the output. The data comes from the matlab/Simulink simulation via the microcontroller. Data could be shifted in one bit at a time or with a wider parallel bus, but 16 bits was chosen in this implementation to match the FPGA data bus size. This component has the following inputs:

N_RESET: Set output data to all 0's asynchronously when reset is asserted.
Sys_clock: All other actions occur on the rising edge of this clock.
N_WR_EN: Shift in one word of data when N_WR_EN becomes asserted. This signal is the N_WR_EN_ SHIFT signal shifted by two clock cycles to ensure the data line has settled.
DQ_IN[15:0]: Data to shift in.

The Hold_data_all has the one output, Data_out[143:0], which contains the shifted data words.

The Config_spi_device[11:0] component 512 has one instantiation per device and contains that device's configuration bits. The signal N_WR_EN_CONFIG_LATCH indicates that the data just shifted into the logic device from the processor should be saved as device configuration data. Typically, this is done once at initialization so that the logic device knows the characteristics of the device it needs to emulate. This component has the following inputs:

N_RESET: Set output data to all 0's asynchronously when reset is asserted, except for chip_select_used which is set to 0xF.

N_WR_EN: N_WR_EN for device n will be asserted when the N_WR_EN_CONFIG_LATCH signal, shifted by two clock cycles to allow the data line to settle, is asserted and the integer value n appears on the data bus. On a high to low transition of N_WR_EN, the data on input CDD will be copied into internal registers to be output to other blocks.

CDD[143:0]: Data from Hold_data_all.

Outputs of Config_spi_device[11:0] correspond to configuration bits in table above under the heading SPI Device Configuration.

The SPI_CHIP_SELECT component 504 decodes the chip selects from the system under development and determines which devices' configured chip selects match.

The inputs for this component are as follows:

reset_N: When reset signal is asserted, the outputs will all be 0.

cs0-cs3: Chip select bits from system under development.

spi_clk: Clock from SPI—unused.

device_chip_select[11:0][3:0]: Array of chip select vectors for each device based on the configuration string.

The output for the SPI_CHIP_SELECT component are as follows:

any_cs: Asserted if cs0-cs3 match any chip select in device_chip_select.

device: device[n] is asserted if the chip select cs0-cs3 matches the chip select configured for device n in device_chip_select[n].

The THITL_SPI_slave_shift_in component 506 reads bits from the MOSI line when any_cs is asserted, stores the data in a register, and provides the register and data bit count as outputs for the next block to compare to the configuration string in order to tell when a device is selected. The inputs for this component are as follows:

N_reset: Output data register and count are set to 0 asynchronously when this signal is asserted.

Sys_clock: All other actions occur on the rising edge of the clock

CLK_SPI: SPI clock from system under development. A bit is shifted in on a high to low transition. This signal is equal to the FPGA input SPI_CLK delayed by about 100 ns due to the debouncing of the clock signal.

GET_A_SPI_BIT: SPI MOSI signal from system under development.

Any_chip_select: any_cs from SPI_CHIP_SELECT. Resets the output data register and count to 0 when any_cs is 0.

The outputs for the THITL_SPI_slave_shift_in component are as follows:

DATA_THITL_SPI_N [23:0]: Data bits shifted in from MOSI. The least significant bit contains the bit that was shifted in most recently.

DATA_THITL_SPI_IN_COUNT[7:0]: The number of data bits in DATA_THITL_SPI_IN.

The spi_comparison[11:0] component 516 has one instantiation per device. When the chip select for the device is active, it compares the data/count output from THITL_SPI_slave_shift_in and the configuration word. If they match, the 'valid device' signal is asserted. The inputs for this component are as follows:

N_RESET: When the reset signal is asserted, valid_device is set to 0.

Sys_clock: All other actions occur on the falling edge of this clock.

Current_chip_select: The output device[n] from SPI_CHIP_SELECT, indicating whether this device has its chip select currently asserted. When the chip select is de-asserted then valid_device is set to 0.

DATA_THITL_SPI_IN [23:0]: Data bits shifted in from MOSI. The least significant bit contains the bit that was shifted in most recently.

DATA_THITL_SPI_IN_COUNT[7:0]: The number of data bits in DATA_THITL_SPI_IN.

Configuration_string[23:0]: The bits to compare to DATA_THITL_SPI_IN.

Command_stop_bit[7:0]: Compare DATA_THITL_SPI_IN to configuration_string when DATA_THITL_SPI_IN_COUNT is equal to command_stop_bit.

Retry_each_byte: If this input is true, then DATA_THITL_SPI_IN and configuration_string will be compared after receiving each byte.

SPI_in_size[7:0]: Unused.

Command_start_bit[7:0]: Unused.

The output for the spi_comparison[11:0] component is Valid_device[n]: The block spi_comparison[n] will assert valid_device[n] if the data received on SPI matches the configuration for device n.

The Device_SPI_data[11:0] component 514 has one instantiation per device and contains that device's data bits. When the 'latch data' register is written to by the host autopilot, the data at the output of Hold_data_all will be stored inside the component as the data string and presented at the output. This block will hold the data that will be sent out on the MISO signal when a device becomes selected. The inputs for this component are as follows:

N_RESET: The data register will be set to zero when the reset signal is asserted.

Sys_clk: All other actions occur on the falling edge of the clock.

Any_cs: Unused.

N_W_enable: N_W_enable for device n will be asserted when the N_WR_EN_CONFIG_LATCH signal, shifted by two clock cycles to allow the data line to settle, is asserted and the integer value n appears on the data bus. On a high to transition of N_W_enable, the data from data_THWIL becomes latched into the internal register and presented at the output, and the new_data signal becomes asserted until the next clock cycle.

data_THWIL[143:0]: The data from hold_data_all.

The outputs for the Device_SPI_data[11:0] component are as follows:

new_data: Will be asserted for one clock cycle when new data is latched into the register.

data_SPI[95:0]: The data that will be used for sending on the MISO line when this device is selected. This register has its value stored on the falling edge of sys_clock and is read on the rising edge of sys_clock in order to prevent one SPI transaction from using some data from an old copy of the register and some from the new copy.

The data_mux_out_spi component 518 is a multiplexer which takes N Configuration words and N data words, selects the appropriate data word based on which "Valid Device N" signal was asserted and outputs the data to the shift register used to shift the data out of the device.

The drop_sdo_on_cs component 524 will tell the MISO line to go to low voltage if a device currently has its chip select active, the device is configured for drop_sdo_when_sample_ready, and new data has been latched into the data register since the last time the device was read. The inputs for this component are as follows:

N_RESET: When reset is asserted, set all internal registers to zero.

Sys_clock: All other actions occur on the rising edge of the clock.

Drop_sdo_when_sample_ready[11:0]: Drop_sdo_when_sample_ready[n] is asserted if device n is configured to set MISO to low voltage when a new sample is ready and has not been read.

New_data[11:0]: New_data[n] is an output from Device_SPI_data[n] to indicate when new data is latched into the data register.

Chip_select_active[11:0]: Chip_select_active[n] will be asserted when the chip select for device n is active.

Valid_device[11:0]: Valid_device[n] will be asserted when device n has matched its configuration bits.

The output for the drop_sdo_on_cs component, Drop_sdo, is asserted if SDO line should be set to low voltage.

The THITL_spi_OUT component will take the data provided by data_mux_out_spi and shift it out the MISO line one bit at a time upon SPI clock transitions. The first bit is sent immediately upon configuration bits match and the next byte is sent upon the next clock. The bits are sent MSB first. The inputs for this component are as follows:

N_RESET: When reset is asserted, the internal registers will be reset and output will be set to high impedance.

Sys_clock: All other actions occur upon rising edge.

Clock: The SPI clock from system under development. A bit is shifted in on a high to low transition. This signal is equal to the FPGA input SPI_CLK delayed by about 100 ns due to the debouncing of the clock signal.

Chip_select: any_cs from SPI_CHIP_SELECT to indicate if any chip select is active.

Valid_device: Asserted when any device is selected, indicating to begin an SPI transfer.

Drop_sdo: Asserted when the output should be set to low voltage until valid_device becomes asserted to begin a transfer.

DAT A_THITL_SPI_OUT [95:0]: Data to send.

SPI_out_size[7:0]: Number of bits to send.

Hold_time: Unused.

SEND_A_SPI_BIT: MISO output.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. An emulator for emulating at least one digital sensor of a system under development communicating over a clocked serial bus, the emulator for use within a True Hardware In the Loop (THWIL) simulator and the emulator comprising:
    a programmable logic device holding device configuration information and dynamic sensor data for the at least one emulated digital sensor, the programmable logic device being connectable to the clocked serial bus of the system under development, the programmable logic device storing the data for the at least one emulated digital sensor in a bank of two or more registers, whereby the programmable logic device ensures that a register is not in the process of being read before storing any new data for the emulated digital sensor;
    an input connecting to a communication line between the emulator and a simulation model of the THWIL simulator, the input for receiving dynamic data from the simulation model of the THWIL simulator, the dynamic data to be used as values for the at least one emulated digital sensor to hold in appropriate registers for access by the system under development;
    a decode mechanism that, based on an address in an SPI/I2C command received from the system under development over the clocked serial bus, selects a register holding the most recent dynamic data to use as response data to the SPI/I2C command received by the at least one emulated digital sensor, and
    an output for sending the response data to the system under development over the clocked serial bus.

2. The emulator of claim 1, wherein the at least one digital sensor is selected from the group consisting of an accelerometer, a temperature sensor, a compass and a gyroscope.

3. The emulator of claim 1, wherein the programmable logic device is an FPGA (Field Programmable Gate Array).

4. The emulator of claim 1, wherein the system under development is a UAV autopilot.

5. The emulator of claim 1, wherein the programmable logic device further comprises a CPLD (Complex Programmable Logic Device).

6. The emulator of claim 1, wherein the clocked serial bus is a SPI (Serial Peripheral Interface).

7. The emulator of claim 1, wherein the clocked serial bus is an I2C (Inter-Integrated Circuit).

8. The emulator of claim 1, wherein the programmable logic device comprises at least one register for storing status reading of the at least one digital device.

9. A True Hardware In the Loop (THWIL) simulation system comprising:
    an emulator according to claim 1;
    the simulation model for generating values for the emulator to sense; and
    a communication mechanism for exchanging data between the emulator and the simulation model.

10. The system of claim 9, wherein the system under development is an autopilot.

11. The system of claim 9, wherein the simulation model is a MATLAB simulation.

12. The system of claim 9, wherein the programmable logic device is located on a master PCB (Printed Circuit Board) and the simulation model is located on a microprocessor.

13. The system of claim 9, wherein the communication mechanism is a microprocessor.

14. The system of claim 9, wherein the programmable logic device receives requests from the system under development through the communication mechanism, each request comprising at least one of a chip select signal, a clock signal and MOSI (Master-Output Slave Input) data.

15. The system of claim 14, wherein the programmable logic device receives a register select signal from the system under development as an encoded 4-bit data stream.

* * * * *